US007999220B2

(12) United States Patent
Odom

(10) Patent No.: US 7,999,220 B2
(45) Date of Patent: Aug. 16, 2011

(54) BOREHOLE MEASUREMENTS USING A FAST AND HIGH ENERGY RESOLUTION GAMMA RAY DETECTOR ASSEMBLY

(75) Inventor: Richard C. Odom, Benbrook, TX (US)

(73) Assignee: Precision Energy Services, Inc., Fort Worth, TX (US)

( * ) Notice: Subject to any disclaimer, the term of this patent is extended or adjusted under 35 U.S.C. 154(b) by 533 days.

(21) Appl. No.: 12/129,812

(22) Filed: May 30, 2008

(65) Prior Publication Data
US 2009/0296084 A1 Dec. 3, 2009

(51) Int. Cl.
G01V 5/12 (2006.01)
(52) U.S. Cl. .................................................. 250/269.3
(58) Field of Classification Search ............... 250/269.3, 250/269.6, 269.7, 264, 269.8, 369, 370.01, 250/370.05, 370.09, 370.11
See application file for complete search history.

(56) References Cited

U.S. PATENT DOCUMENTS

| 3,747,001 | A |   | 7/1973  | Fasching et al. |           |
|-----------|---|---|---------|-----------------|-----------|
| 4,476,384 | A | * | 10/1984 | Westphal        | 250/252.1 |
| 4,507,554 | A | * | 3/1985  | Hertzog et al.  | 250/269.8 |
| 4,766,543 | A | * | 8/1988  | Schmidt         | 702/8     |
| 4,872,507 | A | * | 10/1989 | Ronco et al.    | 166/57    |
| 5,055,676 | A | * | 10/1991 | Roscoe et al.   | 250/269.7 |
| 6,590,957 | B1 |  | 7/2003  | Warburton       |           |
| 7,084,403 | B2 |  | 8/2006  | Srivastava et al. |         |
| 7,439,515 | B2 | * | 10/2008 | Bak            | 250/369   |
| 7,573,026 | B2 | * | 8/2009  | Kurkoski et al. | 250/262   |
| 2003/0076914 | A1 |  | 4/2003  | Tiller et al.  |           |
| 2004/0149917 | A1 |  | 8/2004  | Dorenbos et al. |         |
| 2005/0056774 | A1 | * | 3/2005  | Samworth      | 250/269.4 |

FOREIGN PATENT DOCUMENTS
WO 2006029475 A1 3/2006

OTHER PUBLICATIONS

Odom, Richard C., Improvements in a Through-Casing Pulsed-Neutron Density Log, SPE71742, pp. 1-9, 2001 SPE Annual Technical Conference and Exhibition, New Orleans, Louisiana Sep. 30, 2001.
Alain Iltis et al., "Lanthanum halide scintillators: Properties and applications", Nuclear Instruments & Methods in Physics Research A, 2006, pp. 359-363.
International Search Report from United Kingdom patent application No. GB090246.1 dated Sep. 23, 2009.

* cited by examiner

Primary Examiner — David P Porta
Assistant Examiner — Faye Boosalis
(74) Attorney, Agent, or Firm — Wong, Cabello, Lutsch, Rutherford & Brucculeri, L.L.P.

(57) ABSTRACT

A gamma ray detector assembly for a borehole logging system that requires the measure of gamma radiation with optimized gamma ray energy resolution and with fast emission times required to obtain meaningful measurements in high radiation fields. The detector assembly comprises a lanthanum bromide (LaBr3) scintillation crystal and a digital spectrometer that cooperates with the crystal to maximize pulse processing throughput by digital filtering and digital pile-up inspection of the pulses. The detector assembly is capable of digital pulse measurement and digital pile-up inspection with dead-time less than 600 nanoseconds per event. Pulse height can be accurately measured (corrected for pile-up effects) for 2 pulses separated by as little as 150 nanoseconds. Although the invention is applicable to virtually any borehole logging methodology that uses the measure of gamma radiation in harsh borehole conditions, the invention is particularly applicable to carbon/oxygen logging.

23 Claims, 2 Drawing Sheets

BOREHOLE MEASUREMENTS USING A FAST AND HIGH ENERGY RESOLUTION GAMMA RAY DETECTOR ASSEMBLY

BACKGROUND

Borehole well logging systems that emit bursts of high energy (of the order of 14 million electron volts (MeV)) neutrons are routinely used in geophysical exploration, recovery and monitoring operations. These systems are typically used in cased boreholes, although some uncased or "open hole" applications are known in the art. As examples, pulsed neutron logging systems are used to measure formation density in cased boreholes, to determine formation lithology, to detect gas within formation pore space, and to identify and to optionally measure the flow of water behind casing.

The earliest commercial pulsed neutron logging system was to delineate saline formation liquid from non-saline liquid, which was assumed to be liquid hydrocarbon. Chlorine in saline water has a relatively large thermal neutron absorption cross section, while carbon and hydrogen in hydrocarbons have relatively small thermal neutron cross sections. The decay rate of thermal neutrons is measured between bursts of fast neutrons by measuring capture gamma radiation as a function of time. This decay rate is, therefore, indicative of the thermal neutron capture cross section of the borehole environs. This quantity is commonly referred to as "sigma". Based upon the large difference thermal neutron absorption cross section of saline water and liquid hydrocarbon, sigma combined with other measurements such as formation porosity is used to obtain a hydrocarbon saturation value for the formation. Again, this saturation value is based upon the assumption that any non-saline pore fluid is hydrocarbon.

All formation waters are not saline. A measure of sigma cannot, therefore, be used to delineate unequivocally between fresh formation water and liquid hydrocarbon. The "carbon/oxygen" or "C/O" logging system was developed to delineate between fresh water and hydrocarbon. The methodology of the C/O logging system is based upon a measure of a ratio of carbon to oxygen content of the borehole environs. This ratio can be used to delineate between fresh formation water and liquid hydrocarbon, because hydrocarbon contains carbon but no oxygen, and fresh water contains oxygen but no carbon. The system, like its "sigma" logging system counterpart, uses a pulsed source of 14 MeV neutrons. The system uses a measure of inelastic scatter gamma radiation (rather than thermal capture gamma radiation) to obtain desired results. Inelastic scatter cross sections are sufficiently large, and the emitted inelastic scatter radiation is sufficiently different in energy to permit the measure of an inelastic gamma radiation ratio indicative of the C/O ratio of the borehole environs. Inelastic scatter reactions are many orders of magnitude faster than the thermal capture process used in sigma logging. As a result, the inelastic scatter radiation measurement must be made during the neutron burst. This results in a very intense "instantaneous" gamma radiation field at the detector assembly. The received radiation is amplified as pulses of collected light and the height of the pulse is related to incident gamma-ray energy. Accurate measurement of the pulse height is corrupted by pulse pile-up (i.e. where one pulse is superimposed on another) resulting from the intense instantaneous radiation. The rejection of pile-up events yields a very low "observed" inelastic count rate from which the C/O information is derived. Stated another way, the observed statistical precision of C/O logging is typically poor even though the "instantaneous" inelastic scatter radiation flux during the burst is quite large. It is of the utmost importance, therefor, to use a fast gamma ray detection system and to minimize pulse pile-up during a measure interval to maximize the statistical precision and the accuracy of measured radiation attributable to carbon and to oxygen inelastic scattering.

SUMMARY OF THE INVENTION

The invention is directed to gamma ray detector assembly for a borehole logging system that requires the measure of gamma radiation with optimized gamma ray energy resolution and with fast emission times required to obtain meaningful measurements in high radiation fields. The detector assembly comprises a lanthanum bromide (LaBr3) scintillation crystal that exhibits outstanding peak resolution and emission time compared to other types of scintillation crystals. For carbon/oxygen logging, another advantage of LaBr3 and other higher density halides such as LaI (U.S. Pat. No. 7,084,403) and LuI (U.S. Pat. No. 7,329,874), is that the lack of oxygen in the crystal matrix offers an incremental boost in C/O sensitivity per unit volume, compared to fast, higher density detectors such as LYSO, GSO, LUAP that contain oxygen.

In intense gamma radiation fields, speed of detector pulse processing and pulse throughput are important considering the discussion in the BACKGROUND section of this disclosure. To maximize processing throughput and to maintain high resolution requires fast measurement and pile-up inspection of the pulses. A digital spectrometer has been designed based on digital filtering and digital pulse pile-up inspection that offers speed and energy resolution improvements over tradition analog measurement and inspection techniques. Concepts of this digital spectrometer are disclosed in U.S. Pat. No. 6,590,957 B1, which is here in entered into this disclosure by reference. The topology of the system in the referenced disclosure has been redesigned and configured for high-temperature operations with a LaBr3 detector crystal for use in well logging. In practice, the detector assembly comprising the digital spectrometer and the LaBr3 crystal is limited by filtering of electronics noise and digital sampling rates. The detector assembly is capable of pulse measurement and digital pile-up inspection with dead-time less than 600 nanoseconds per detection event (nS/event). Pulse height (thus energy resolution) can be accurately measured (corrected for pile-up effects) for 2 pulses separated by as little as 150 nanoseconds (nS). This detector assembly performance is facilitated by the combination of the LaBr3 detector crystal and the digital filtering and digital pile-up inspection spectrometer of the referenced disclosure.

Although the invention is applicable to virtually any borehole logging methodology that uses the measure of gamma radiation in harsh borehole conditions, the invention is particularly applicable to C/O logging.

BRIEF DESCRIPTION OF THE DRAWINGS

The manner in which the above recited features and advantages, briefly summarized above, are obtained can be understood in detail by reference to the embodiments illustrated in the appended drawings.

DETAILED DESCRIPTION OF THE PREFERRED EMBODIMENTS

The invention will be disclosed as a multipurpose well logging system that is adaptable to measure previously mentioned geophysical logging applications. It should be understood that the invention could be equally embodied as a "stand-alone" system designed to measure a single parameter of interest such as a carbon/oxygen ratio.

The multipurpose pulsed-neutron system must be versatile enough to cover many different cased-hole applications including reservoir evaluation using sigma measurements, reservoir evaluation using carbon/oxygen (C/O) measurements, and behind casing water flow. The system must further providing an alternative to traditional open-hole logging such as through casing density and neutron porosity logging, and gas detection. As a result, various design trade-offs are used in optimizing these specific applications. For example, the formation porosity is a measure of the spatial distribution of radiation and requires certain axial detector assembly spacings from the source. Carbon/oxygen (C/O) logging is a spectral energy measurement and requires high count-rates at detector assemblies axially spaced close to the neutron source.

Figure 1:
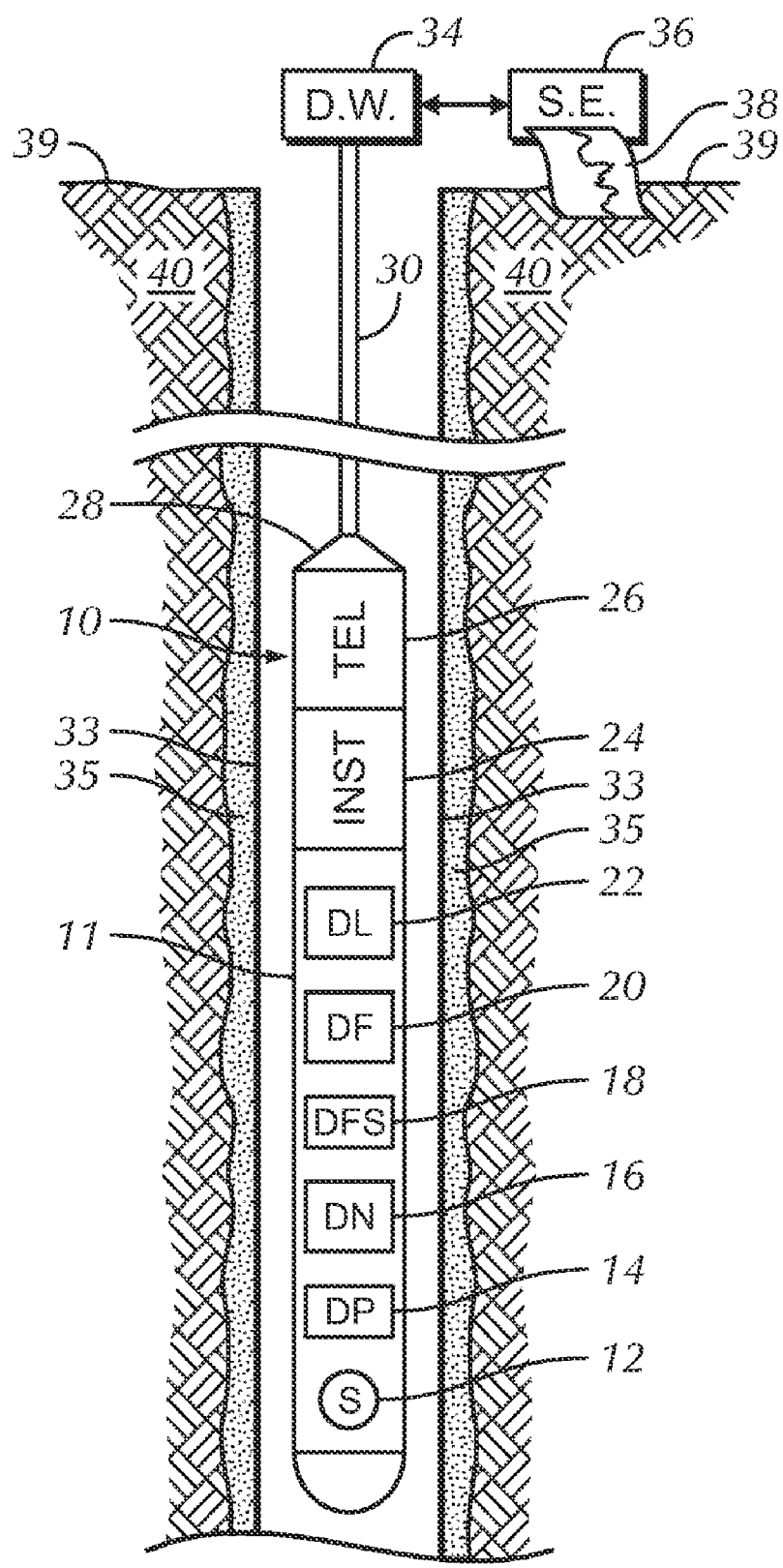
FIG. 1 illustrates a multipurpose pulsed neutron logging instrument comprising four gamma ray detector assembly and disposed within a borehole penetrating an earth formation.

FIG. 1 illustrates a multipurpose pulsed neutron logging instrument 10 disposed within a borehole 32 penetrating an earth formation 40. The borehole is cased with casing 33, and the casing-borehole annulus is filled with a grouting material such as cement. Subsection 11 houses an array of detector assemblies as well as a pulsed neutron generator 12. More specifically, there are four detector assemblies each comprising a LaBr3 detector crystal and a digital spectrometer for filtering and pulse inspection. These detector assemblies are referred to as the proximal detector assembly 14, the near detector assembly 16, the far detector assembly 20, and long detector assembly 22. These detector assemblies are disposed at increasing axial spacings from the neutron generator 12, as their names imply. Between the near detector assembly 16 and the far detector assembly 20 is disposed a fast neutron detector 18 that measures the fast neutron output flux and pulse shape of the neutron generator 12. This array was originally disclosed in the publication "Improvements in a Through-Casing Pulsed Neutron Density Log" paper SPE 71742, 2001 SPE Annual Conference Proceedings, which is herein entered into this disclosure by reference. The use of detector assemblies LaBr3 crystal and the previously referenced digital spectrometer have been added to the array to improve the C/O results.

The subsection 11 is operationally connected to an instrument subsection 24. The instrument subsection houses control circuits and power circuits to operate and control the elements of the subsection 11. A telemetry subsection 26 is operationally connected to the instrument section 24. A suitable connector 28 connects the multipurpose logging tool 10 to a lower end of a preferably multiconductor logging cable 30. The upper end of the logging cable 30 terminates at a draw works, which is well known in the art and is represented conceptually at 34.

Still referring to FIG. 1, detector assembly response data are telemetered from the tool 10 to the surface 39 of the earth where they are received by an uphole telemetry unit (not shown) preferably disposed within surface equipment 36. These data are processed in a surface processor (not shown) within the surface equipment 36 to yield a log 38 of one or more parameters of interest. Alternately, data can be partially of completely processed in a downhole processor within the instrument section 24 and telemetered via the telemetry subsection 26 to the surface equipment 36. Control parameters can also be telemeterd from the surface equipment 36 to the tool 10 via the telemetry system and wireline cable 30.

Again referring to FIG. 1, the tool 10 is designed to go through tubing (not shown), has an outside diameter of 1.69 inches (4.29 centimeters), and is rated for operations at 20 thousand pounds per square inch (Kpsi) pressure and at a maximum temperature of about 325 degrees Fahrenheit (° F.).

Although shown embodied in a wireline logging tool, the detector assembly 11 can also be embodied in other borehole instruments. These instruments include pump-down ("memory") instruments conveyed by drilling fluid flow, instruments conveyed by coiled tubing, instruments conveyed by a drill string, and instruments conveyed by a "slick line".

The LaBr3 Detector Crystal

In 2006 the LaBr3 crystal was introduced in a logging package by Saint Gobain (www.saint-gobain.com) under the trademark BriLanCe380™. In Table 1, the physical parameters for this crystal are compared with properties of other scintillation crystals used in prior art well logging detector assemblies. The scintillation crystals are NaI, BGO, GSO in addition to LaBr3. The crystal properties are light output in percent, energy resolution in percent, crystal density in grams per cubic centimeter, effective atomic number, and scintillation decay time or "emission time" in microseconds.

TABLE 1

Physical properties of $LaBr_3$ and other scintillators used in well logging (*designates 3 inch (diameter) by 3 inch (length) crystals. Resolutions are for $^{137}Cs$ gamma radiation at 0.662 MeV)

| CRYSTAL PROPERTY | NaI | BGO | GSO | $LaBr_3$ |
|---|---|---|---|---|
| Light output (%) | 100 | 12 | 18 | 165 |
| Energy Resolution (%) | 7* | 9.3 | 8 | 2.9* |
| Density (g/cc) | 3.67 | 7.13 | 6.71 | 5.08 |
| Effective atomic number | 50 | 74 | 59 | 47 |
| Temperature coeff. (%/C) | −0.3 | −1.5 | −0.3 | −0.05 |
| Decay time (μsec) | 230 | 300 | 60 & 600 | 16 |

Again referring to Table 1, the outstanding features of LaBr3 are the peak resolution, temperature response and emission time. In the gamma radiation energy ranges or "windows" used in one C/O logging method, good peak resolution is important to assure accurate energy calibrations. More advanced C/O logging methods use spectral fitting techniques such as Library Least Squares for formation lithology identification or C/O determination. This approach exploits the good energy resolution of LaBr3 to add more uniqueness to library spectrum elements. The temperature response assures good resolution and stable measurement across the temperature range encountered in the borehole environment.

Similar to NaI, LaBr3 exhibits a thermal neutron activation background. More specifically, the bromine in LaBr3 has a relatively large thermal neutron activation cross section with the induced isotopes being gamma ray emitters. Preliminary test results indicate that the bromine activation that appears on the tail of the decay is about twice as strong as the iodine activation in NaI. There are two activation daughters. The first is 82Br that decays with a half life of 1.47 days. The second and more troublesome is 80Br which has two decay modes with half lives of 17.68 minutes and 4.4 hours. This neutron activation background signal can be minimized by thermal neutron shielding of the LaBr3 crystal.

The Digital Spectrometer and Pulse Selection System

To achieve the optimal scintillation pulse throughput for the detector assembly, the detector assembly uses a digital spectrometer designed by XIA LLC that is disclosed in detail in the previously referenced U.S. Pat. No. 6,590,957 B1. The digital spectrometer has been configured to obtain detector assembly specifications discussed in subsequent sections of this disclosure.

Figure 2:
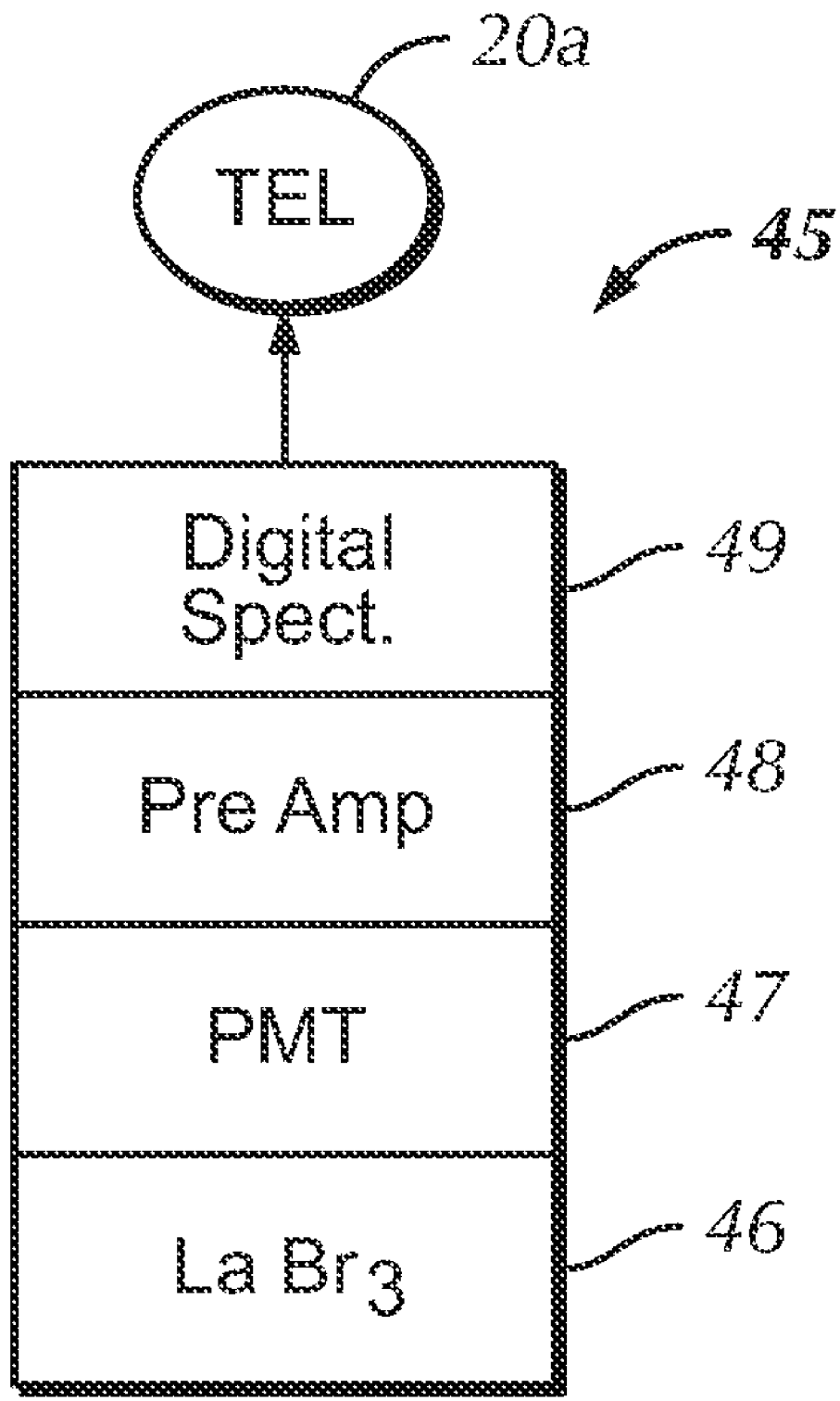
FIG. 2 illustrates major elements of a gamma ray detector assembly.

FIG. 2 illustrates major elements of each gamma ray detector assembly 45. A LaBr3 crystal 46 is optically coupled to a photomultiplier tube 47. Output pules from the photomultiplier tube 47 pass through a preamplifier 48 and into the digital spectrometer 49. The pulse processor of the digital spectrometer 49 receives the "raw" detector data and uses digital filtering and digital inspection techniques to process these data by pulse height and time, and to discard "pile-up" pulses which are events that are ruined by pulse pile-up. All gamma ray events down to 100 KeV are processed in order to preserve resolution.

Referring again to FIG. 1, this means that the proximal detector assembly 14 and near detector assembly 16 can be exposed to a gamma radiation field greater than one million pulses per second during a pulse from the neutron generator 12. This intense "instantaneous" count rate is typical for neutron generator output and detector assembly axial spacings for the logging tool 10 depicted in FIG. 1. Throughput tests have established a processing dead-time of approximately 0.8 microseconds. This translates to a theoretical maximum of 480,000 events (in terms of instantaneous count rates) that can be effectively processed by the detector assembly 45 depicted in FIG. 2.

Results Using the Detector Assembly

In practice, the response of the detector assembly 45 is limited by filtering of electronics noise and digital sampling rates. It has been demonstrated that the assembly 45 is capable of pulse measurement and pile-up inspection with dead-time of less than 600 nS/event. Pulse height can be accurately resolved and measured (corrected for pile-up pulse effects) for 2 pulses separated by as little as 150 nS.

It is instructive to express specifications of the LaBr3 crystal 46 cooperating with the digital spectrometer 49 in terms of well logging precision. In the context of C/O logging precision, the logging tool 10 was operated in high-porosity carbonate calibration standards with oil and water in the pore space and fresh water in the borehole. The neutron source was operated at a pulse repetition rate of about 5 kiloHertz (KHz) with each burst having a duration of about 30 microseconds. The "window ratio" C/O technique was used. Count rates refer to those recorded by the near detector assembly 16. The carbon count rate C represents first group of pulses recorded in the carbon energy window ranging from about 3.0 to about 4.7 MeV. The oxygen count rate O represents a second group of pulses recorded in the oxygen energy window ranging from about 4.7 MeV to about 6.4 MeV. A typical two foot (0.61 meters) logging sample at 6 feet (1.82 meters) per minute represents 20 seconds. Operating at 80 percent of the maximum throughput, the counts collected by the digital spectrometer 49 are approximately 52,000 and 30,000 for the carbon and oxygen windows, respectively. Given the C/O ratio for the standard with fresh water in the pore space is 1.73, the following expression for the standard deviation of the C/O ratio in this carbonate as:

$$\sigma_{C/O} = \sqrt{\left(\frac{C}{O}\right)^2 \left(\frac{1}{C} + \frac{1}{O}\right)} \quad (1)$$

The deviation of the C/O ratio is 0.012, and enfolding the dynamic range between these standards, the deviation is 7.7 saturation units (s.u.), which is an apparent improvement over prior art assemblies.

The above disclosure is to be regarded as illustrative and not restrictive, and the invention is limited only by the claims that follow.

What is claimed is:

1. A borehole instrument comprising a neutron generator axially spaced from a gamma ray detector assembly, said assembly comprising:
   a LaBr3 scintillation crystal; and
   a digital spectrometer cooperating with said LaBr3 scintillation crystal and configured to
      measure pulses from said scintillation crystal,
      digitally filter said pulses from said scintillation crystal,
      digitally inspect the filtered pulses to detect pile-up pulses,
      periodically forming an estimate of an average ratio of said measured pulses per non-pile-up pulse, and
      reject said pile-up pulses by combining said measured pulses with said ratio;
   wherein;
      said neutron generator emits a plurality of bursts of neutrons the duration of each burst of said plurality of bursts being about 30 microseconds and said plurality of bursts being emitted at a repetition rate of about 5 KHz; and
      said detector assembly is operated during said bursts.

2. The borehole instrument of claim 1 wherein said detector assembly measures pulses and digitally filters pulses and digitally inspects pulses and rejects said pile-up pulses with dead-time less than 600 nanoseconds per event.

3. The borehole instrument of claim 1 wherein said detector assembly measures and resolves heights of two said pulses separated by about 150 nanoseconds.

4. The borehole instrument of claim 1 wherein said detector assembly operates at about 325 degrees Fahrenheit.

5. The borehole instrument of claim 1 wherein said borehole instrument is conveyed by a wireline or a drill string or coiled tubing or a slick line or drilling fluid flow.

6. The borehole instrument of claim 1 wherein a first group said pulses is collected in a gamma ray energy range of about 3.0 MeV to about 4.7 MeV and a second group is collected in a gamma ray energy range of about 4.7 MeV to about 6.4 MeV.

7. A borehole instrument comprising a neutron generator axially spaced from a gamma ray detector assembly, said assembly comprising:
   a LaBr3 scintillation crystal; and
   a digital spectrometer cooperating with said LaBr3 scintillation crystal and configured to
      measure pulses from said scintillation crystal,
      digitally filter said pulses from said scintillation crystal,
      digitally inspect the filtered pulses to detect pile-up pulses, and
      reject said pile-up pulses;
   wherein
      said neutron generator emits a plurality of bursts of neutrons the duration of each burst of said plurality of bursts being about 30 microseconds and said plurality of bursts being emitted at a repetition rate of about 5 KHz; and said detector assembly is operated during said bursts;

a first group said pulses is collected in a gamma ray energy range of about 3.0 MeV to about 4.7 MeV and a second group is collected in a gamma ray energy range of about 4.7 MeV to about 6.4 MeV;

a C/O ratio is formed from the ratio of said first group to said second group;

said C/O ratio is indicative of the amount of carbon to oxygen within environs in which said borehole instrument operates; and determining said C/O ratio to a precision of about 0.012 standard deviation for a 20 second sample for a single detector.

8. The borehole instrument of claim 7 wherein said detector assembly measures pulses and digitally filters pulses and digitally inspects pulses and rejects said pile-up pulses with dead-time less than 600 nanoseconds per event.

9. The borehole instrument of claim 7 wherein said detector assembly measures and resolves heights of two said pulses separated by about 150 nanoseconds.

10. The borehole instrument of claim 7 wherein said detector assembly operates at about 325 degrees Fahrenheit.

11. The borehole instrument of claim 7 wherein said borehole instrument is conveyed by a wireline or a drill string or coiled tubing or a slick line or drilling fluid flow.

12. A method for measuring radiation in a borehole, the method comprising:

disposing a gamma ray detector assembly within said borehole wherein said assembly comprises a $LaBr_3$ scintillation crystal; and a digital spectrometer cooperating with said LaBr3 scintillation crystal and configured to measure pulses from said scintillation crystal, digitally filter said pulses from said scintillation crystal, digitally inspect the filtered pulses to detect pile-up pulses, periodically forming an estimate of an average ratio of said measured pulses per non-pile up pulse, and reject said pile-up pulses by combining said measure of pulses with said ratio;

disposing a neutron generator within said borehole axially spaced from the detector assembly;

generating a plurality of bursts of neutrons with the neutron generator wherein the duration of each said burst is about 30 microseconds and said plurality of bursts is emitted at a repetition rate of about 5 KHz; and operating the detector assembly during each burst of said plurality of bursts.

13. The method of claim 12 further comprising, with said detector assembly, measuring and digitally filtering and digitally inspecting and rejecting said pile-up pulses with dead-time less than 600 nanoseconds.

14. The method of claim 12 further comprising, with said detector assembly, accurately measuring heights of two said pulses separated by about 150 nanoseconds.

15. The method of claim 12 further comprising operating said detector assembly at about 325 degrees Fahrenheit.

16. The method of claim 12 wherein:

said detector assembly and said neutron generator are disposed within a borehole instrument that is conveyed in said borehole by a wireline or a drill string or coiled tubing or a slick line or drilling fluid flow.

17. The method of claim 12 further comprising collecting a first group said pulses in a gamma ray energy range of about 3.0 MeV to about 4.7 Mev and collecting a second group of said pulses in a gamma ray energy range of about 4.7 MeV to about 6.4 MeV.

18. A method for measuring radiation in a borehole, the method comprising:

disposing a gamma ray detector assembly within said borehole wherein said assembly comprises a $LaBr_3$ scintillation crystal; and a digital spectrometer cooperating with said LaBr3 scintillation crystal and configured to measure pulses from said scintillation crystal, digitally filter said pulses from said scintillation crystal, digitally inspect the filtered pulses to detect pile-up pulses, and reject said pile-up pulses;

disposing a neutron generator within said borehole axially spaced from the detector assembly;

generating a plurality of bursts of neutrons with the neutron generator wherein the duration of each said burst is about 30 microseconds and said plurality of bursts is emitted at a repetition rate of about 5 KHz;

operating the detector assembly during each burst of said plurality of bursts;

collecting a first group said pulses in a gamma ray energy range of about 3.0 MeV to about 4.7 MeV and collecting a second group of said pulses in a gamma ray energy range of about 4.7 MeV to about 6.4 MeV;

forming a C/O ratio from a ratio of said first group to said second group;

from said C/O ratio determining an indicator of the amount of carbon to oxygen within environs in which said borehole instrument is operating; and determining said C/O ratio to a precision of about 0.012 standard deviation for a 20 second sample for a single detector.

19. The method of claim 18 further comprising, with said detector assembly, measuring and digitally filtering and digitally inspecting and rejecting said pile-up pulses with dead-time less than 600 nanoseconds.

20. The method of claim 18 further comprising, with said detector assembly, accurately measuring heights of two said pulses separated by about 150 nanoseconds.

21. The method of claim 18 further comprising operating said detector assembly at about 325 degrees Fahrenheit.

22. The method of claim 18 wherein:

said detector assembly and said neutron generator are disposed within a borehole instrument that is conveyed in said borehole by a wireline or a drill string or coiled tubing or a slick line or drilling fluid flow.

23. The method of claim 18 further comprising collecting a first group said pulses in a gamma ray energy range of about 3.0 MeV to about 4.7 MeV and collecting a second group of said pulses in a gamma ray energy range of about 4.7 MeV to about 6.4 MeV.

* * * * *